United States Patent Office 3,236,105
Patented Feb. 22, 1966

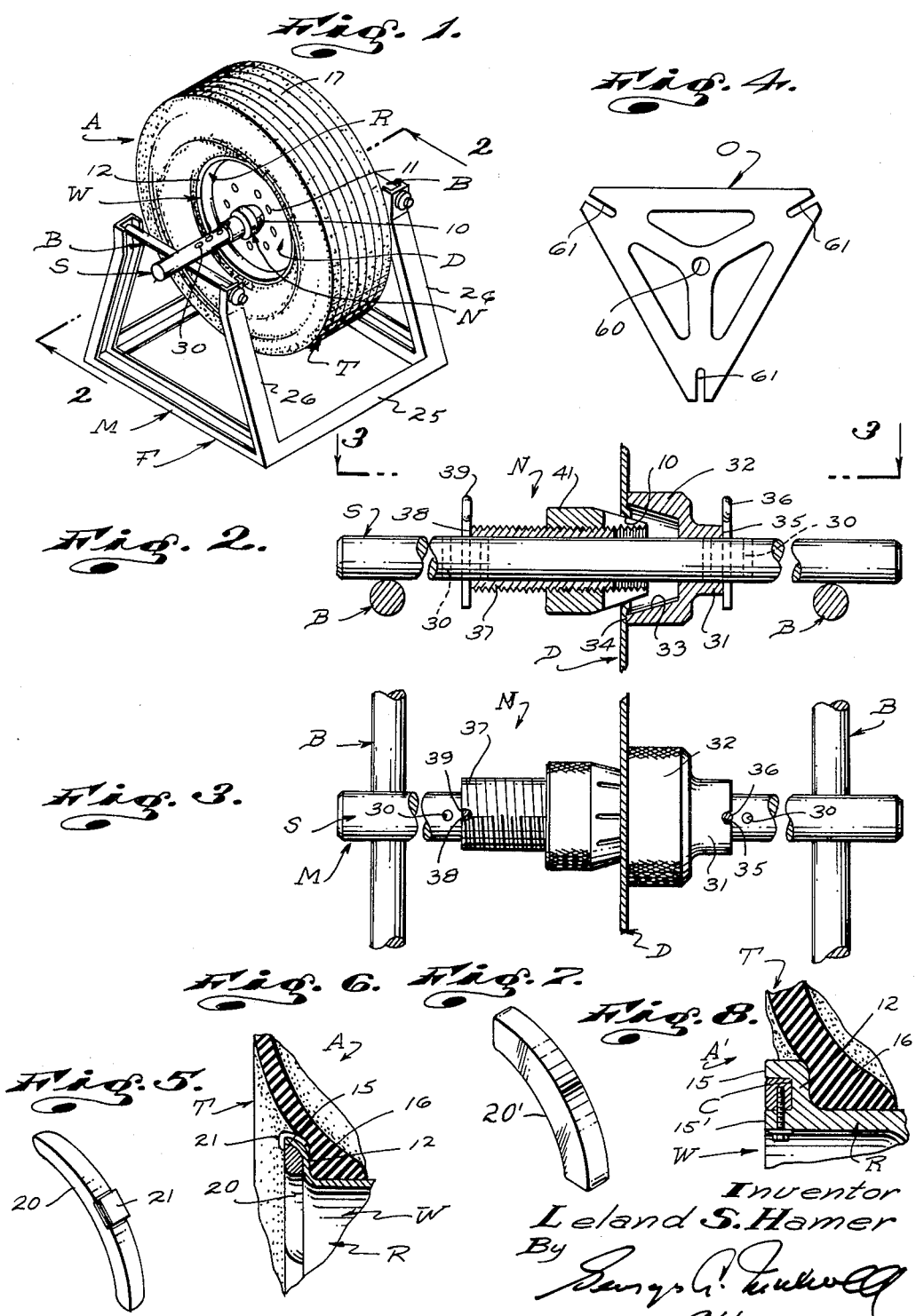

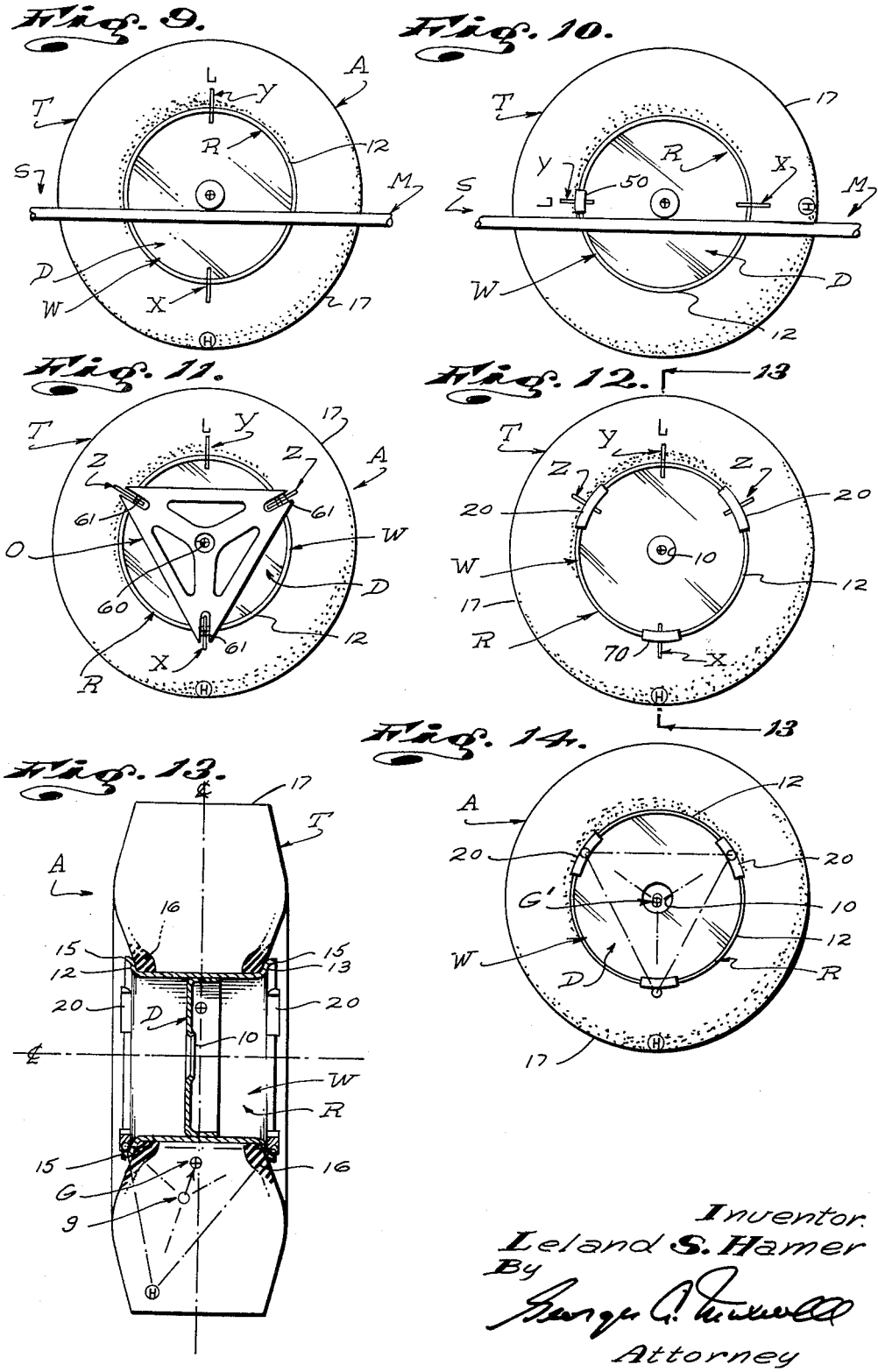

3,236,105
AUTOMOBILE WHEEL BALANCING METHOD
Leland S. Hamer, 4170 Lakewood Drive,
Lakewood, Calif.
Filed Aug. 3, 1965, Ser. No. 476,843
15 Claims. (Cl. 73—481)

This is a continuation-in-part of my co-pending application for Letters Patent, Serial No. 348,940, filed March 3, 1964, and entitled "Method and Apparatus for Balancing Automotive Wheel Assemblies."

This invention relates to a novel method for balancing wheels and is more particularly concerned with a new and improved method for balancing automotive type wheel assemblies with a plurality of circumferentially spaced weights applied to the inside and outside rims of the wheels.

It is to be understood that reference to "automobile," "automotive" and/or "automotive type wheels," is meant to include all wheel assemblies which include pneumatic tires and such as are used on aircraft as well as on most forms of ground vehicles.

In the past, efforts were made to balance automotive type wheel assemblies by locating the heavy side of a wheel assembly, determining the magnitude of the effect of the unbalancing mass in the assembly at the rim of the wheel and engaging a lead weight, of appropriate or counterbalancing mass to the rim of the wheel, diametrically opposite to the heavy side thereof. Accordingly, if the unbalancing mass of the wheel assembly was two ounces and was located at the inner edge of the tread about the outer periphery of the tire, the effect of the mass, at the adjacent rim engaging bead portion of the tire, or at the rim would be, for example, four ounces. This increased effect of such a mass is due to the radical displacement of the mass. Accordingly, and in accordance with common practice, a lead weight of four ounces would be engaged on the outside rim of the wheel diametrically opposite the heavy side of the wheel.

The above method of balancing automotive wheel assemblies does not take into consideration the radial displacement of the unbalancing mass and the effect of centrifugal forces acting thereon, when the wheel assemblies are rotated. It seeks to compensate for and balance such masses by the arbitrary placement of a weight on the rim of the wheel, without regard to the radial and axial placement or distribution of the unbalancing mass.

Obviously, such a method, while effective to balance wheel assemblies while they are static or when they are rotated at one particular speed, is wanting and is ineffective to balance wheel assemblies in such a manner as to afford balanced, vibration-free rotation of the wheel assemblies through a wide range of speeds.

Further, since it is generally impossible to determine the axial displacement of the unbalancing mass in a wheel assembly, and since it is seldom, if ever, that the unbalancing mass is in the same radial plane as the inner or the outer rim of the wheel to which the lead balancing weights are fixed, the above method of balancing wheels is ineffective to overcome wobbling and axial vibrations of the wheel assemblies, resulting from axial placement of the unbalancing masses from the central radial plane of the wheels and/or placement of the unbalancing masses axially from the plane of the inner or the outer rim of the wheel and in which the counterbalancing weights or masses are arranged.

In practice, some technicians following the old method of balancing wheels as set forth above have split the counterbalancing weight, that is, employed two weights in place of a single weight, each being one-half the desired counterbalancing mass. One such weight is engaged on the outside rim of the wheel and the other weight is engaged on the inside rim of the wheel, opposite the lower side of the tire or wheel assembly. By following this procedure, the axial placement of the unbalancing mass is, to a limited extent, compensated for.

Rim weights, as provided by the art, come in several predetermined or standard sizes. For instance, rim weights are frequently produced in one-half ounce modules, that is, a given make of rim weights is produced in one-half ounce size, one ounce size, one and one-half ounce size, two ounce size, two and one-half ounce size, three ounce size, and so on and up to, for example, ten ounce size. As a result, the technician balancing wheels in accordance with present methods can, as a general rule, only select a weight which is close to but not the same mass as the unbalancing mass in the tire or the effect of said mass at the radially inwardly spaced rim of the wheel. To compensate for the difference in the related masses, the technician is forced to cheat and shift the balancing rim weight circumferentially on the rim of the wheel and away from that point which is diametrically opposite the unbalancing mass and so that when the wheel is freely rotated on a horizontal axis, the wheel will come to rest with the rim weight and the center of gravity of the unbalancing mass below and close to, but not on a central horizontal plane through the wheel assembly. In this situation, where both the unbalancing mass and the rim weight occur in a plane parallel with and offset from the central plane of the wheel, another or secondary unbalanced condition in the wheel assembly is created. That is, by shifting a rim weight to compensate for the differential in weight between the rim weight and the effect of the unbalancing mass only results in creating a new unbalance condition and defeats the results sought to be gained.

An object of the present invention is to provide a novel method for balancing automotive type wheel assemblies wherein weights are applied to the inside and outside rims of a wheel at the heavy side of the wheel and in two positions spaced 120° from the heavy side; whereby the weights at the heavy side of the wheel cooperate with the unbalancing mass to move or locate the center of gravity of the heavy side of the tire radially inwardly toward the rims of the wheel and axially toward the central radial plane of the wheel; whereby the several circumferentially spaced weights, or sets of weights, cooperate to locate or dispose their combined center of gravity at or adjacent the central axis and central radial plane of the wheel; and whereby the several weights cooperate to generate a gyrostatic effect when the wheel assembly is rotated and which stabilizes the wheel assembly and results in a smooth turning wheel assembly.

Another object of my invention is to provide a method of the character referred to wherein the two pairs of weights applied to the rims in spaced relationship from the heavy side of the wheel assembly are of identical weight or mass and where the sum of the unbalancing mass and the pair of weights at the heavy side of the wheel is equal to each of the other pairs of weights.

That is, if the effect of the unbalancing mass at the rim of the wheel is four ounces, the sum of the pairs (each) of spaced weights is twenty ounces (comprising two ten ounce weights), the sum of the unbalancing four ounce mass and its related weights is twenty ounces, that is, the unbalancing four ounce mass and two eight ounce weights.

It is a further object of this invention to provide a method for balancing and/or stabilizing automotive wheel assemblies which is fast, simple and accurate, and a method requiring the exercise of ordinary skill.

The various objects and features of my invention will be fully understood from the following detailed description of a typical preferred form and application of my invention, throughout which description reference is made to the accompanying drawings, in which:

FIG. 1 is an isometric view of a typical automotive wheel assembly related to a piece of apparatus provided by the instant invention;

FIG. 2 is a sectional view taken as indicated by line 2—2 on FIG. 1;

FIG. 3 is a view taken substantially as indicated by line 3—3 on FIG. 2;

FIG. 4 is a view of another piece of apparatus employed in carrying out my new method;

FIG. 5 is an isometric view of a typical rim weight;

FIG. 6 is a sectional view of a portion of a conventional wheel assembly with a typical rim weight engaged therewith;

FIG. 7 and FIG. 8 are similar to FIG. 5 and FIG. 6 and show a typical aircraft wheel construction and a weight therefor;

FIGS. 9 through 12 and 14 are similar diagrammatic views showing the several steps in carrying out my new method; and, FIG. 13 is an enlarged diagrammatic view taken as indicated by line 13—13 on FIG. 12.

The present invention has to do with a novel method for balancing an automotive type wheel assembly.

In the drawings, I have illustrated a typical automotive wheel assembly A, which assembly includes a wheel W having a central, radially extending and axially disposed disc portion D with a central hub receiving opening 10 and a plurality of circumferentially spaced stud receiving openings 11. The wheel W further includes an annular axially extending rim portion R fixed to and extending about the periphery of the disc portion D and provided with radially outwardly projecting annular end flanges 12 and 13, at its inner and outer ends. The flanges 13 and 14 have axially outwardly turned lips 15 about their outer peripheries.

The wheel assembly W further includes a pneumatic tire T having an annular radially inwardly opening semi-circular casing with a pair of axially spaced rim and rim flange-engaging beads 16 at its inner peripheral edges and a thick rubber, road-engaging tread portion 17 with a substantially flat radially outwardly disposed road-engaging surface about its outer peripheral portion and substantially coextensive with the axial extent of the tire.

The tire T is engaged about the rim R of the wheel W with its axially spaced beads 16 in seated, sealing engagement in the corners established by the rim R and the rim flanges 12 and 13.

The foregoing is typical of conventional automotive type wheel assemblies. In practice, certain variations in proportioning and the like are employed or provided by different manufacturers of tires and wheels, but such variations in no way affect the present invention.

For example, in FIG. 8 of the drawings, I have illustrated a portion of a typical aircraft construction A'. In this construction, I have designated parts and/or portions similar to the above noted automotive wheel assembly with like reference characteristics. This wheel structure distinguishes over the first considered wheel structure by the provision of a second, radially outwardly projecting lip 15', which lip is spaced radially inward of the lip 15 and cooperates therewith and with the flange 12 to define an annular, axially outwardly opening weight-receiving channel C.

Since the ordinary wheel assemblies, such as are illustrated and described above, are well known to those familiar with the art, I will not burden this application with further unnecessary illustration and description thereof.

The ordinary or conventional rim weight 20, illustrated in FIGS. 5 and 6 of the drawings, involves an elongate arcuate body of lead or other suitable metal having a radially outwardly and axially inwardly disposed inner portion corresponding in outside configuration with the axially outwardly and radially inwardly disposed surface of that portion of the wheel defined by the rim portion 13 and its related lip 15, and a trim-appearing, axially outwardly and radially inwardly disposed outer portion. The ordinary weight 20 further includes a radially inwardly projecting and, thence, axially inwardly extending malleable metal lip-engaging clip 21.

In the usual practice, the weight 20 is engaged and seated in the seat or corner established by the rim flange 13 and lip 15 to which it is related, to extend circumferentially thereof and so that the clip 21 extends about the outer edge of the flange lip 15 and, thence, inwardly across the inner surface of the lip. The clip 21 cooperates with the weight to establish clamped engagement on the flange lip. The clip itself is held clamped between the flange lip and the adjacent portion of the tire bead 16.

The weight 20 set forth above is a typical wheel balancing weight, commonly referred to as a "rim weight." In practice, there exists slight variations in proportioning and exterior configuration of rim weights produced by different manufacturers. However, the differences referred to above are of a minor nature and in no way affect the novelty of the present invention.

In FIG. 7 of the drawings, I have shown a weight 20' for engagement in the channel C of the wheel W, illustrated in FIG. 8. The weight 20' is a simple, arcuate weight corresponding in cross-sectional configuration with the channel C and is adapted to be seated in the channel and held fixed therein by means of a suitable screw fastener, as clearly illustrated in FIG. 8.

While rim weights, such as are referred to above, are particularly adapted for use in carrying out the present invention, it is to be understood that other especially designed weights, which might be related and/or secured to other portions of the wheel assembly, could be employed without departing from the spirit of this invention.

The apparatus that I provide includes a mass finding means or mechanism M and a template O.

The means or mechanism M involves a pair of laterally spaced, parallel, horizontal beams B, frame means F supporting the beams in spaced relationship above a deck or other supporting surface, an elongate, horizontally disposed bearing shaft S adapted to extend transverse of and to be supported by the beams B and mounting means N releasably mounting the wheel assembly to the shaft S, intermediate the ends thereof.

The beams B are simple, elongate, horizontally disposed, cylindrical bars.

The frame F is a simple frame structure fabricated of channel and angle-iron stock and is characterized by an elongate, rectangular, deck-engaging base 25 and elongate, substantially vertically extending columns 26 projecting upwardly from each corner of the base.

The beams B are arranged above the ends of the base 25 to extend transverse the longitudinal axis thereof and are fixed to the upper ends of the columns 26 to be supported thereby and to serve the added function of completing and/or reinforcing the frame.

In practice, the beams are secured to or in the frame so that they can be rotated to present a new top surface on the beam on which the shaft S is supported, as circumstances require.

It is to be understood that the prime purpose of the frame F is to support the beams B in lateral spaced, horizontal, parallel relationship and in spaced relationship above the supporting surface or deck and that, in practice, any suitable frame-like structure can be employed without departing from the spirit of this invention.

The shaft S is a simple, straight, elongate, horizontally disposed, cylindrical bar and is provided with a plurality of axially spaced, transversely extending pin-receiving openings 30 in its central portion.

The mounting means N includes a stop collar 31 slidably engaged on one end portion of the shaft S. The collar 31 is provided with an axially inwardly projecting annular flange 32 defining an axially inwardly opening socket 33 through which the shaft S freely extends and an annular, axially inwardly disposed stop surface 34.

The outer end of the collar is provided with a pair of axially aligned, radially extending, axially outwardly opening pin-receiving notches 35.

A stop pin 36 is engaged through one of the pin receiving openings 30 in the adjacent end portion of the shaft S and occurring axially outwardly from the collar 31. The collar is slid axially outwardly on the shaft and is suitably rotated so that the pin 36 seats in the notches 35 and in such a manner that the collar is suitably stopped against axial outward shifting and rotation relative to the shaft.

The means N further includes an elongate, externally threaded carrier sleeve 37, which sleeve is slidably engaged on the other end portion of the shaft S. The sleeve 37, like the collar 31, is provided with stop pin-receiving notches 38 at its outer end, which notches engage the stop pin 39 engaged through one of the openings 30 occurring in the other end portion of the shaft, whereby the sleeve 37 is releasably held against axial outward shifting and rotation on the shaft S.

The means N further includes an internally threaded follower 40 engaged on and about the sleeve 37, which follower is provided with an axially, inwardly convergent, annular cone 41, which cone is adapted to project through and to seat in the central opening 10 of a wheel W to be balanced and which also projects into the socket 33 in the collar 31.

In practice, the cone 41 is split or bifurcated axially to impart limited resiliency and self-centering characteristics to the cone.

In operation, the collar 31 or the sleeve and follower assembly are removed from engagement on the shaft S, which removal is made possible by removal of the pin 36 or pin 39, related thereto.

The wheel assembly A is next engaged on the shaft so that the disc portion D is seated on the cone 41 or against the annular stop surface 34 of the collar 31. The collar 31 and its related pin 36, or the sleeve and follower assembly, and its related pin 39, whichever part or assembly was removed, is next re-engaged on the shaft and into engagement with the wheel W as illustrated in the drawings.

The follower 41 is next advanced axially inwardly on the sleeve 37 to urge the cone thereof tightly and snugly into the opening 10 in the wheel and in such a manner as to accurately center the wheel and to urge it into tight engagement on the stop surface 34 of the collar.

It will be apparent that the means N that I provide is such that it can be advantageously and effectively adjusted to engage, center and hold or mount substantially all standard or conventional automotive type wheel assemblies.

When the wheel assembly A is mounted on the shaft S, the assemblage is elevated and arranged with the frame F and beams B, with the wheel assembly A between the beams and with the ends of the shaft S in rolling, supported engagement on the beam B.

When the wheel assembly A is thus related to the means N, the assembly is permitted to roll or turn freely until the heavy side of the assembly occurs and comes to rest at the bottom, as diagrammatically illustrated in FIG. 9 of the drawings.

In the drawings, I have indicated the presence of a heavy, unbalancing mass in the tire by the character H, which character is circled.

It is to be noted that the bearing support afforded by the shaft S and the beams B is substantially frictionless and is such that the slightest unbalanced mass will cause the wheel to turn and that the side of the wheel in which the mass occurs, will come to rest at the bottom.

When the wheel assembly comes to rest, as set forth above, the heavy side of the wheel is marked adjacent the rim R, as illustrated at X. The light side of the wheel, diametrically opposite the heavy side, indicated by the character L, is similarly marked, as at Y.

Next, finder weights are engaged on the rim R of the wheel, at the mark Y, until a finder weight 50 which counterbalances the unbalancing mass H, is found.

The mass of the weight 50 is determined. The above end is attained by finding a weight 50 which, when applied to the rim R of the wheel W, at the mark Y, cancels the effect of the unbalancing mass H and permits the wheel to roll freely and come to rest in an infinite number of rotative positions.

In practice, if the wheel assembly, with the weight 50 applied thereto, is positioned statically, as illustrated in FIG. 10 of the drawings, wherein the light and heavy sides of the wheels are in a common horizontal plane, the wheel will remain static.

The mass of the weight 50, which must be noted, is determined by reading the mass noted on the weight, or by weighing the weight on suitable scales.

For the purpose of example and explanation, it will be presumed that the effect of the unbalancing mass, at the rim R on the light side of the wheel, is four ounces.

With the heavy side of the wheel thus located and the magnitude of the unbalancing mass thus determined, the wheel is removed from the apparatus or mechanism M.

The wheel assembly is next marked, as at Z, at two circumferentially spaced stations, each of which is 120° from the mark X and which are 120° apart from each other.

Location and application of the marks Z is, in the preferred carrying out of the invention, facilitated by the template O, which template comprises a flat, thin, plate-like part having a center opening 60 which can be conveniently and accurately aligned with the opening 10 of the wheel W, and three circumferentially spaced, radially extending slots 61, which slots are spaced radially outwardly and are of sufficient radial extent to extend across the rim portions of the wheel assembly A, as clearly illustrated in FIGS. 4 and 11 of the drawings.

In practice, the marks X, Y and Z, can be made by chalk, a suitable grease pencil, or any other suitable means.

With the wheel assembly thus marked, two pairs of like balance weights 20, each of which is of an arbitrary mass, are selected. The mass of the weights 20 are of relatively great magnitude, say, for example, ten ounces, and so that the sum of each pair of weights is twenty ounces.

Each pair of balance weights 20 is arranged with the center of gravity of each weight on the radial plane of one of the marks Z and with one of said weights at and fixed to the inside rim R and the other weight at and fixed to the outside rim R of the wheel W, as clearly illustrated in FIGS. 12 and 13 of the drawings.

Next, a single pair of like load weights 70 are selected. The combined mass of the weights 70 is equal to the sum of each pair of balance weights 20, less or minus the mass of the unbalancing mass H, which has been previously determined.

In a hypothetical case, the unbalancing mass is four ounces. Accordingly, the sum of the two weights 70 is sixteen ounces and each of said weights is eight ounces.

The weights 70 are related and fixed to the inside and outside rims of the wheel W, with their centers of gravity on the radial plane indicated by the mark X.

With the weights 70 thus fixed to the wheel, the wheel assembly is balanced.

It is to be noted that the combined mass of each pair of balance weights must be greater than the magnitude of the unbalancing mass H.

Further, in the preferred carrying out of the invention, the weights 70 are considerably greater than the unbalancing mass H. For instance, as in the hypothetical case, each weight 70 is eight ounces, or two times greater than the mass H.

Referring to FIG. 13 of the drawings, it will be apparent that the weights 70 cooperate with the mass H in such a manner that the effect of the mass H is materially altered.

As illustrated, the mass H is at the outer edge of the tread portion of the tire T. It is to be noted that such a location or dispositioning of an unbalancing mass is the most extreme and undesirable location for such a mass and does, in fact, set forth an exaggerated condition.

If the mass H and the weights 70 were of identical mass, the center of gravity would be at the circle marked g. It will be noted that the mark g is spaced axially inwardly towards the central radial plane of the wheel and is spaced radially inwardly from the mass H, considerable distances.

However, in view of the fact that the weights 70 are twice the mass H, the resulting center of gravity of the three masses now under consideration is moved further axially and radially inwardly and to a position substantially as indicated at G.

Since the weights 70 are two times heavier than the mass H, the point G or center of gravity occurs approximately midway between the center g and that point which would represent the center of a straight line between the weights 70.

In light of the above, it will be apparent that if the difference between the mass of the weights 70 and the mass H is increased, the center of gravity G would be moved further inwardly and closer to the central radial plane of the wheel and the axial plane of the rims.

Accordingly, the center of gravity of the heavy side of the wheel assembly A is brought into close proximity to the central radial plane of the assembly A and to the axial plane of the rims of the said assembly.

The center of gravity of each pair of weights 20 is theoretically at a point midway between the ends of a straight line between the weights or, at the central plane of the wheel and the axial plane of the rims.

It will be apparent, however, that the weights 20 probably do, in fact, act on undetermined adjacent misplaced masses in the tire T in much the same manner as the weights 70 act on or with the mass H (or other possible adjacent misplaced masses) and bring about collateral beneficial effects.

Referring next to FIG. 14 of the drawings, the pairs of weights 20 and the combined mass H and weights 70 cooperate with each other. As illustrated, the center of gravity G' of the seven distinct masses occurs at the approximate central axis of the wheel assembly and at approximately the central radial plane of the wheel. The true center of gravity G' of the distinct groups of masses would, as indicated, be towards the heavy side of the wheel, or the mass H, from dead center, but, as indicated, such displacement from center would be slight and would be within the opening 10 in the wheel and in the axle member with which the wheel assembly is ultimately related.

When the wheel is rotated and the effect of the mass H is increased by virtue of its greater outward radial displacement than the weights 70, the weights 70 still or continue cooperating with the mass H to keep the center of gravity G well within allowable tolerances. As noted above, the greater difference between the weights 70 and the mass H, the greater effect the weights 70 have in this respect.

Further, when the balanced wheel is rotated and the effective center of gravity of the heavy side of the wheel is moved slightly outwardly as a result of centrifugal forces, the pairs of counterbalance weights continue to act with the several masses at the heavy side of the wheel and the resulting center of gravity G' at the center of the wheel will move outwardly slightly, but to a considerably less degree than the center G.

It will be noted that the three equally spaced groups of masses establish a gyrostatic action, the static center of which occurs at G' or near of the wheel assembly, where the centrifugal forces which might be encountered as a result of center displacement are, in the range of speed at which vehicle wheels rotate, negligible.

The static center of the centrifugal force created by the three masses is, in practice, never so far from center that the effect of the resulting unbalanced condition reaches a very large magnitude.

As a result of the above, the gyrostatic action afforded by the invention not only overcomes or effectively diminishes unbalanced conditions in the wheel assembly, to a point or degree where they are no longer detectable or a problem, but also steadies, stabilizes and holds the wheel assembly against bodily displacement by the multitude of minor irregularities present in ordinary roadways and effectively buffers and softens the shocks which result from bodily displacement of the wheel assembly resulting from engaging and rolling over major irregularities or obstacles, frequently encountered in and on such roadways.

It will be apparent that, if desired, the like load weights 70 can be applied to the heavy side of the wheel first, whereupon pairs of like balance weights 20, the mass of each pair being equal to the sum of the weights 70 and the mass H, are selected and applied to their designated points or stations on the rims of the wheel.

While the above sequence of steps is slightly different, the end result is the same.

The benefit to be found in the first-noted sequence, that is, applying the balance weights 20 and subsequently applying the load weights 70 resides in the fact that the four weights 20 are alike and can be standard weights, leaving only the two load weights 70 to be carefully selected and trimmed, if trimming is required.

In the last-mentioned or alternative sequence, the two load weights 70 may be standard, but the four balance weights must be carefully selected and rimmed, if necessary, thus compounding this relatively exacting task.

Having described only a typical preferred form and application of my invention, I do not wish to be limited or restricted to the specific details herein set forth, but wish to reserve to my self any modifications or variations that may appear to those skilled in the art and which fall within the scope of the following claims.

Having described my invention, I claim:

1. The method of balancing an unbalanced automotive wheel assembly including, a wheel with a central radially extending disc portion and an elongate axially extending rim portion with inner and outer ends and with axially spaced radially outwardly projecting flanges at its ends, and a pneumatic tire engaged about the rim portion and between the flanges thereof including; first, locating the radial plane through the wheel assembly that extends through the center of gravity of the unbalancing mass in the wheel assembly; second, determining the weight effect of said unbalancing mass at the rim portion of the wheel adjacent said mass; next applying like load weights to the inside and outside ends of the rim on a common radial plane with said mass; and, finally, applying like balance weights to the inside and outside ends of the rim portion of the wheel on two radial planes spaced 120° circumferentially from the radial plane of the unbalancing mass, the combined mass of the pair of balance weights on each of said spaced radial planes being equal to the combined mass of the unbalancing mass and the pair of load weights.

2. The method of balancing an unbalanced automotive wheel assembly including a wheel with a central radially extending disc portion and an elongate axially extending annular rim portion with inner and outer ends and with axially spaced radially outwardly projecting flanges at said ends and a pneumatic tire engaged about the rim portion and between the flanges including; first, applying a first mark on the radial plane of the wheel assembly that extends through the center of gravity of the unbalancing mass in the wheel assembly; second, applying a second mark on the wheel assembly diametrically opposite the first mark; third, applying two third marks on the wheel assembly on radial planes spaced circumferentially 120° from the first mark; next applying a finder weight on the rim at the second mark which counterbalances the unbalancing mass when the wheel is freely rotatably supported on its horizontal axis; next, removing said finder weight and applying four like rim weights on the inner and outer ends of the rim portion in a common radial plane with the third marks; finally, applying two like load weights to the inner and outer ends of the rim at said first mark, the combined mass of the load weights and unbalancing mass being equal in mass to the balance weights at each said third mark.

3. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging and releasably securing the wheel in axial alignment on an elongate shaft, intermediate the ends thereof; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the same radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, arranging a template with a central orienting opening and three equally and circumferentially spaced, radially extending slots in axial alignment adjacent the wheel assembly in axial alignment therewith and with one slot aligned with the first mark; ninth, applying two like third marks on the rim at the other two slots in the template; tenth, removing the template; eleventh, applying four balance weights on the inner and on the outer ends of the rim adjacent the third marks and each with its center of gravity on the radial plane of one of the said third marks, the combined mass of the two balance weights related to each third mark being greater than twice the mass of the finder load weight; and twelfth, applying load weights to the inner and outer ends of the rim adjacent the first mark with their centers of gravity in alignment with the radial plane of said first mark, the combined mass of the two load weights being equal to the combined mass of the pair of balance weights related to one third mark less the mass of the finder load weight.

4. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging the wheel assembly on a shaft with an annular stop collar at one end portion and a threaded sleeve carrying an annular cone at its other end portion and with said cone in wedging centering engagement in the center opening in the wheel and urging the wheel into stopped engagement against said collar; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the same radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, arranging a template with a central orienting opening and three equally and circumferentially spaced, radially extending slots in axial alignment adjacent the wheel assembly in axial alignment therewith and with one slot aligned with the first mark; ninth, applying two like third marks on the rim at the other two slots in the template; tenth, removing the template; eleventh, applying four balance weights on the inner and on the outer ends of the rim adjacent the third marks and each with its center of gravity on the radial plane of one of the said third marks, the combined mass of the two balance weights related to each third mark being greater than twice the mass of the finder load weight; and twelfth, applying load weights to the inner and outer ends of the rim adjacent the first mark with their centers of gravity in alignment with the radial plane of said first mark, the combined mass of the two load weights being equal to the combined mass of the pair of balance weights related to one third mark less the mass of the finder load weight.

5. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging and releasably securing the wheel in axial alignment on an elongate shaft, intermediate the ends thereof; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the same radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, applying two third marks to the rim at points spaced 120° from the first mark and from each other; ninth, applying four balance weights on the inner and on the outer ends of the rim adjacent the third marks and each with its center of gravity on the radial plane of one of the said third marks, the combined mass of the two balance weights related to each third mark being greater than twice the mass of the finder load weight; and tenth, applying load weights to the inner and outer ends of the rim adjacent the first mark with their centers of gravity in alignment with the radial plane of said first mark, the combined mass of the two load weights being equal to the combined mass of the pair of balance weights related to one third mark less the mass of the finder load weight.

6. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging the wheel assembly on a shaft with an annular stop collar at one end portion and a threaded sleeve carrying an annular cone at its other end portion and with said cone in wedging centering engagement in the center opening in the wheel and urging the wheel into stopped engagement against said collar; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the said radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, applying two third marks to the rim at points spaced 120° from the first mark and from each other; ninth, applying four balance weights on the inner and on the outer ends of the rim adjacent the third marks and each with its center of gravity on the radial plane of one of the said third marks, the combined mass of the two balance weights related to each third mark being greater than twice the mass of the finder load weight; and tenth, applying load weights to the inner and outer ends of the rim adjacent the first mark with their centers of gravity in alignment with the radial plane of said first mark, the combined mass of the two load weights being equal to the combined mass of the pair of balance weights related to one third mark less the mass of the finder load weight.

7. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, locating the side of the wheel at which said heavy mass occurs; second, applying a first mark on the rim adjacent to and in the same radial plane as the heavy mass; third, applying a second mark on the rim diametrically opposite the first mark; fourth, applying a finder load weight to the rim at said second mark, the mass of which balances the effect of the heavy mass when the wheel is static, whereby the wheel and shaft assembly comes to rest at an infinite number of rotative positions when rotated relative to the beams; fifth, removing the finder load weight; sixth, arranging a template with a central orienting opening and three equally and circumferentially spaced, radially extending slots in axial alignment adjacent the wheel assembly in axial alignment therewith and with one slot aligned with the first mark; seventh, applying two like third marks on the rim at the other two slots in the template; eighth, removing the template; ninth, applying four balance weights on the inner and on the outer ends of the rim adjacent the third marks and each with its center of gravity on the radial plane of one of the said third marks, the combined mass of the two balance weights related to each third mark being greater than twice the mass of the finder load weight; and tenth, applying load weights to the inner and outer ends of the rim adjacent the first mark with their centers of gravity in alignment with the radial plane of said first mark, the combined mass of the two load weights being equal to the combined mass of the pair of balance weights related to one third mark less the mass of the finder load weight.

8. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, locating the side of the wheel at which said heavy mass occurs; second, applying a first mark on the rim adjacent to and in the same radial plane as the heavy mass; third, applying a second mark on the rim diametrically opposite the first mark; fourth, applying a finder load weight to the rim at said second mark, the mass of which balances the effect of the heavy mass when the wheel is static, whereby the wheel and shaft assembly comes to rest at an infinite number of rotative positions when rotated relative to the beams; fifth, removing the finder load weight; sixth, applying two third marks to the rim at points spaced 120° from the first mark and from each other; seventh, applying four balance weights on the inner and on the outer ends of the rim adjacent the third marks and each with its center of gravity on the radial plane of one of the said third marks, the combined mass of the two balance weights related to each third mark being greater than twice the mass of the finder load weight; and eighth, applying load weights to the inner and outer ends of the rim adjacent the first mark with their centers of gravity in alignment with the radial plane of said first mark, the combined mass of the two load weights being equal to the combined mass of the pair of balance weights related to one third mark less the mass of the finder load weight.

9. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging and releasably securing the wheel in axial alignment on an elongate shaft, intermediate the ends thereof; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the same radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, arranging a template with a central orienting opening and three equally and circumferentially spaced, radially extending slots in axial alignment adjacent the wheel assembly in axial alignment therewith and with one slot aligned with the first mark; ninth, applying two like third marks on the rim at the other two slots in the template; tenth, removing the template; eleventh, applying load weights on the inner and outer ends of the rim adjacent the first mark with their centers of gravity in alignment with the radial plane of said first mark; and twelfth, applying four balance weights on the inner and on the outer ends of the rim adjacent the third marks and each with its center of gravity on the radial plane of said third marks, the combined mass of the two balance weights related to each third mark being equal to the combined mass of the finder load weight and the two load weights.

10. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging the wheel assembly on a shaft with an annular stop collar at one end portion and a threaded sleeve carrying an annular cone at its other end portion and with said cone in wedging centering engagement in the center opening in the wheel and urging the wheel into stopped engagement against said collar; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the same radial plane as the heavy mass; fifth, applying a second mark on the rim diametrically opposite the first mark; sixth, applying a finder load weight to the rim at said second mark; the mass of which balances the effect of the heavy mass when the wheel is static, whereby the wheel and shaft assembly comes to rest at an infinite number of rotative positions, when rotated relative to the beams; seventh, removing the finder load weight and removing the wheel assembly from the shaft; eighth, arranging a template with a central orienting opening and three equally and circumferentially spaced, radially extending slots in axial alignment adjacent the wheel assembly in axial alignment therewith and with one slot aligned with the first mark; ninth, applying two like third marks on the rim at the other two slots in the template; tenth, removing the template; eleventh, applying load weights on the inner and outer ends of the rim adjacent the first mark with their centers of gravity in alignment with the radial plane of said first mark; and twelfth, applying four balance weights on the inner and on the outer ends of the rim adjacent the third marks and each with its center of gravity on the radial plane of said third marks, the combined mass of the two balance weights related to each third mark being equal to the combined mass of the finder load weight and the two load weights.

11. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging and releasably securing the wheel in axial alignment on an elongate shaft, intermediate the ends thereof; second, arranging the wheel and shaft assembly between a pair of spaced, horizontal, parallel frame supported beams, with the ends of the shaft in rolling supported engagement on the beams, third, allowing said wheel and shaft assembly to rotate relative to the beams and to come to rest with the heavy mass at the bottom of the tire; fourth, applying a first mark on the rim adjacent to and in the same radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, applying two third marks to the rim at points spaced 120° from the first mark and from each other; ninth, applying load weights on the inner and outer ends of the rim adjacent the first mark into their centers of gravity in alignment with the radial plane of said first mark; and twelfth, applying four balance weights on the inner and on the outer ends of the rim adjacent the third marks and each with its center of gravity on the radial plane of said third marks, the combined mass of the two balance weights related to each third mark being equal to the combined mass of the finder load weight and the two load weights.

12. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, arranging the wheel assembly on a shaft with an annular stop collar at one end portion and a threaded sleeve carrying an annular cone at its other end portion and with said cone in wedging centering engagement in the center opening in the wheel and urging the wheel into stopped engagement against said collar; second, arranging the wheel and shaft assembly between a pair of spaced, horizontal, parallel frame supported beams, with the ends of the shaft in rolling supported engagement on the beams; third, allowing said wheel and shaft assembly to rotate relative to the beams and to come to rest with the heavy mass at the bottom of the tire; fourth, applying a first mark on the rim adjacent to and in the said radial plane as the heavy mass; fifth, applying a second mark on the rim diametrically opposite the first mark; sixth, applying a finder load weight to the rim at said second mark, the mass of which balances the effect of the heavy mass when the wheel is static, whereby the wheel and shaft assembly comes to rest at an infinite number of rotative positions when rotated relative to the beams; seventh, removing the finder load weight and removing the wheel assembly from the shaft; eighth, applying two third marks to the rim at points spaced 120° from the first mark and from each other; ninth, applying load weights on the inner and outer ends of the rim adjacent the first mark with their centers of gravity in alignment with the radial plane of said first mark; and tenth, applying four balance weights on the inner and on the outer ends of the rim adjacent the third marks and each with its center of gravity on the radial plane of said third marks, the combined mass of the two balance weights related to each third mark being equal to the combined mass of the finder load weight and the two load weights.

13. The method of balancing a wheel assembly including, a wheel with a radial disc portion having a center opening therein, an annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, locating the side of the wheel at which said heavy mass occurs; second, applying a first mark on the rim adjacent to and in the same radial plane as the heavy mass; third, applying a second mark on the rim diametrically opposite the first mark; fourth, applying a finder load weight to the rim at said second mark, the mass of which balances the effect of the heavy mass when the wheel is static, whereby the wheel and shaft assembly comes to rest at an infinite number of rotative positions when rotated relative to the beams; fifth, removing the finder load weight; sixth, arranging a template with a central orienting opening and three equally and circumferentially spaced, radially extending slots in axial alignment adjacent the wheel assembly in axial alignment therewith and with one slot aligned with the first mark; seventh, applying two like third marks on the rim at the other two slots in the template; eighth, removing the template; ninth, applying load weights on the inner and outer ends of the rim adjacent the first mark with their centers of gravity in alignment with the radial plane of said first mark; and tenth, applying four balance weights on the inner and on the outer ends of the rim adjacent the third marks and each with its center of gravity on the radial plane of said third marks, the combined mass of the two balance weights related to each third mark being equal to the combined mass of the finder load weight and the two load weights.

14. The method of balancing a wheel assembly including, a wheel with a radial disc portion having a center opening therein, an annular axially extending rim portion about disc portion and having inner and outer ends and an annular pneumatic tire engaged about the rim portion of the wheel, said tire having a heavy mass at a point spaced radially outward from the rim portion of the wheel and axially between the ends of the rim, said method including; first, locating the side of the wheel at which said heavy mass occurs; second, applying a first mark on the rim adjacent to and in the same radial plane as the heavy mass; third, applying a second mark on the rim diametrically opposite the first mark; fourth, applying a finder load weight to the rim at said second mark, the mass of which balances the effect of the heavy mass when the wheel is static, whereby the wheel and shaft assembly comes to rest at an infinite number of rotative positions when rotated relative to the beams; fifth, removing the finder load weight; sixth, applying two third marks to the rim at points spaced 120° from the first mark and from each other; seventh, applying load weights to the inner and outer ends of the rim adjacent the first mark with their centers of gravity in alignment with the radial plane of said first mark; and eighth, applying four balance weights on the inner and on the outer ends of the rim adjacent the third marks and each with its center of gravity on the radial plane of said third marks, the combined mass of the two balance weights related to each third mark being equal to the combined mass of the finder load weight and the two load weights.

15. The method of balancing a wheel assembly including, a wheel with a radial disc portion having a center opening therein, and annular axially extending rim portion about the disc portion and having inner and outer ends and an annular pneumatic tire engaged about the rim portion of the wheel, said tire having a heavy mass at a point spaced radially outward from the rim portion of the wheel and axially between the ends of the rim, said method including; first, locating the side of the wheel at which said heavy mass occurs; second, applying a finder load weight to the rim diametrically opposite the heavy side, the mass of which balances the effect of the heavy mass when the wheel is static; next applying two pairs of like balance weights and one pair of load weights to the wheel, each pair of balance weights being arranged on radial planes spaced 120° from the radial plane of the heavy side of the wheel and 120° from each other, one weight of each pair of balance weights being fixed to the inner and the other fixed to the outer ends of the rim, the combined mass of each pair of balance weights being greater than twice the mass of the load finder weight, the load weights being fixed to the inner and outer ends of the rim on a common radial plane with the heavy mass, the combined mass of the load weights and the heavy mass being equal to the combined mass of each of said pairs of balance weights.

No references cited.

RICHARD C. QUEISSER, *Primary Examiner.*